J. H. GUGLER.
MEANS FOR CONTROLLING ELECTRIC CIRCUITS.
APPLICATION FILED SEPT. 22, 1910.

1,070,456.

Patented Aug. 19, 1913.

Witnesses

Julius H. Gugler, Inventor

Attorney

UNITED STATES PATENT OFFICE.

JULIUS H. GUGLER, OF MILWAUKEE, WISCONSIN.

MEANS FOR CONTROLLING ELECTRIC CIRCUITS.

1,070,456. Specification of Letters Patent. Patented Aug. 19, 1913.

Application filed September 22, 1910. Serial No. 583,150.

*To all whom it may concern:*

Be it known that I, JULIUS H. GUGLER, of Milwaukee, Wisconsin, have invented a Means for Controlling Electric Circuits, of which the following is a specification.

This invention relates to automatic electric current switches in which a counter electromotive force may or may not exist, and in which it is desired that current should flow only in one direction in such conditions as are met in the charging of storage batteries from compound-wound and other dynamos and in the operation of two or more compound-wound or other direct-current dynamos in parallel.

The object of my present invention is to produce a combination of elements which will, first, act to close a circuit automatically when it is in the proper condition to generate current in the right direction, so that the closing of the circuit shall not be dependent upon a predetermined minimum or maximum voltage condition but shall be dependent solely upon a difference of voltage, or in other words in the charging of a storage battery from any source the automatic device shall close whenever there is a higher voltage of proper polarity on the charging side of a charging circuit; secondly, automatically open the circuit when the current falls to zero, and by convenient adjustments permit the same switch to open a circuit for either a predetermined maximum reverse current or a predetermined minimum current flowing in the proper direction; thirdly, prevent the closing of a circuit of wrong polarity, thus in the charging of a storage-battery avoiding the possibility of connecting opposite poles from charging source to battery; fourthly, automatically open the circuit through the same switch should the current generated exceed a predetermined maximum value, and fifthly, automatically open the circuit should the potential thereof for any reason rise beyond a predetermined maximum.

To this end my invention comprises the constructions and combinations of elements which will be hereinafter described and more particularly set forth in my claims.

I have illustrated three forms of my invention in the accompanying drawings, wherein—

Figure 1:
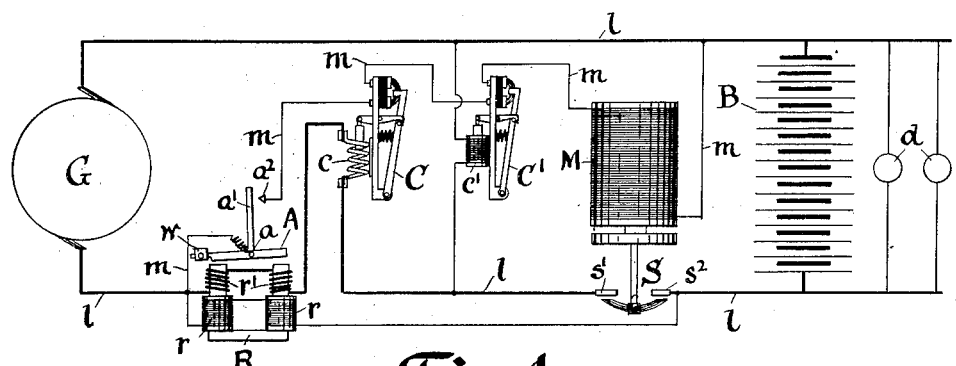
Figure 2:
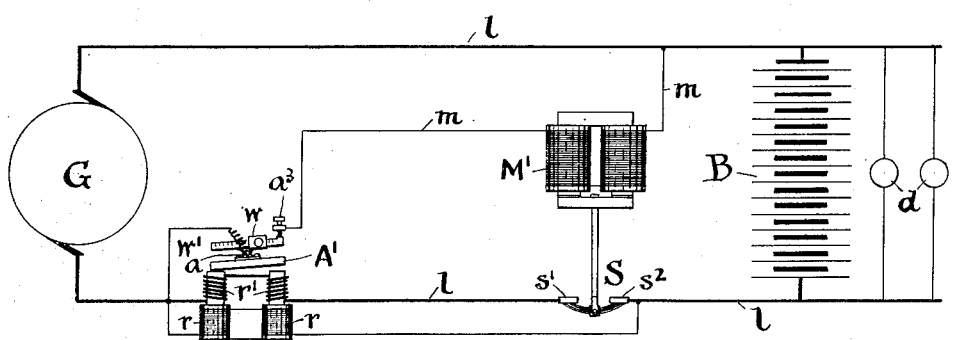

Figure 1 is a diagram of a combination embodying all the elements; Fig. 2 is a simpler form of the invention, a part of the elements being omitted; and Fig. 3 is a diagram of an alternative construction of the form shown in Fig. 2.

Figure 3:
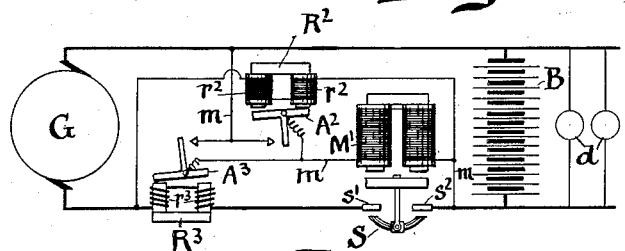

In Figs. 1 and 3, the circuit is in the open or inoperative condition and in Fig. 2 in the closed or operative condition. In all three figures, G denotes a generator or set of generators, 1, 1 the line-wires, B the counter-electromotive force of the circuit, as for example a storage battery, and $d$, $d$ current-using devices, as for example lamps, motors, etc. The main switch S is inserted on one side or the other of the circuit to make and break it, said switch being electrically operated by a solenoid M, and magnet M', or other suitable electromagnetic device, which is energized from a suitable source of current, conveniently but not necessarily that of the dynamo G, being in such case wound to be connected directly across the poles thereof by the leads $m$, with intercalated devices which will now be described. A relay-magnet R or R' is provided with series-coils $r'$ intercalated on one side of the line, and with shunt-coils $r$ which are connected substantially across the poles $s'$, $s^2$ of the main-switch S in shunt as shown; and further with a polarized armature A or A' pivoted upon a pin $a$ intermediate between the poles. The coils $r'$ and $r$ are wound as shown to produce consequent polarity, that is to say both poles of the relay-magnet will be either north or south poles in accordance with the direction of the current, in such manner that current flowing in one direction will tilt said armature to one side and current flowing in the opposite direction will tilt said armature to the other side. Said armature is further arranged so that when no current is flowing, or when a predetermined minimum direct current or a predetermined maximum reverse current is flowing, the armature will be tilted in the same direction as would be produced by a reverse-current; which several results may be produced, by an adjustable weight $w$ sliding upon the armature, or upon a scale-bar $w'$ mounted thereon, or other equivalent device. This armature is arranged to open and close the circuit $m$ of the electromagnetic device M or M', as shown by the contact-arm $a'$ in Fig. 1 coöperating with a stop $a^2$, and by the adjustable set-screw $a^3$ in Fig. 2 coöperating with the end of the scale-bar $w'$; in which case the armature is arranged to close the circuit when tilted against the weight $w$, by the attraction of the relay R or R', in a manner which will be hereinafter described.

In addition to the relay R, the circuit $m$ contains two circuit-breakers C and C', the former of which has a coil $c$ intercalated in the main line so as to open said circuit $m$ at a predetermined maximum of current in the main line, and the other breaker C', a shunt-coil $c'$, which is connected across the poles of the main line as shown and adjusted so as to open said circuit $m$ should the potential in the main line rise above a predetermined maximum.

Assuming the circuit to be open, as it will be normally when the generator is not running, the line $m$ being broken at $a'$, $a^2$, and assuming the generator to be started, as soon as the voltage of the generator G rises so as to exceed that of the counter-electromotive force B by the predetermined difference, a current will flow through the coils $r$ of sufficient strength to pull over the polarized armature A against the weight $w$ and thus close the circuit $m$ of the electromagnetic device M. Said device will in turn attract its armature and close the switch S, thus permitting current to flow through the main line. The closing of said switch short-circuits the coils $r$, and therefore in so far as these coils are concerned releases the armature A; but as the excess of generated potential over the counter-electromotive force was above the predetermined minimum before the closing of the switch, the current which is now permitted to flow through the coils $r'$ will also be above the predetermined minimum and will therefore hold the armature A in the position to close the circuit $m$. This state of things will continue so long as the current is above the predetermined minimum; but should the current fall below said minimum or cease to flow in the same direction or reverse to a predetermined maximum value depending upon the position of the weight $w$, the armature A will be immediately tilted to the opposite side, thus opening the circuit $m$, causing the electromagnetic device M to release and open the switch S, thereby protecting the generator.

The direction and value of current necessary to tilt armature A to open circuit $m$ are dependent upon the position of weight $w$ and the residual magnetism remaining under certain conditions in relay magnet R or R'. Assuming that it is desired to have the switch S open at a predetermined maximum reverse-current and that the generator is running and the circuit is closed as shown in Fig. 2, the circuit will remain closed so long as the current does not reverse to a predetermined maximum value, which value is adjusted by the position of weight $w$ on scale bar $w'$ in Fig. 2. Should, however, the current reverse it would first fall to zero or reach a neutral condition. This would not tilt armature A as the residual magnetic polarity combined with the influence of weight $w$ in the position in which it is set will be sufficient to keep armature A in the closing position. The current would then reverse and would change the polarity of magnet R', and upon reaching a sufficient maximum reverse strength would open line $m$ and thus in turn open switch S. In the same manner the relay switch may be adjusted with weight $w$ so that it will open when current flowing from generator reaches a zero or neutral value. Should, on the other hand, the current rise above its predetermined maximum, the coil $c$ of the circuit-breaker C will attract its armature and open said circuit-breaker, thus again breaking the circuit $m$ and deënergizing the electromagnetic device M and causing the main switch S to be opened. The same result will take place should the voltage of the circuit rise above a predetermined maximum, at which time the coil $c'$ of the breaker C' will attract its armature and open said breaker, so as to open the circuit $m$.

Instead of providing the relay R or R' with two sets of coils, two independent relays $R^2$ and $R^3$ may be used in parallel as shown in Fig. 3, one of these relays $R^2$ being provided with shunt-coils and being connected across the terminals of the switch S as are the coils $r$ in Figs. 1 and 2, and the other being provided with series-coils $r^3$ which are intercalated in one of the line-wires 1, the same as the coils $r'$; said coils $r^2$, $r^3$ being wound in opposition so as to produce two like poles acting on the respective ends of the armature $A^2$ and $A^3$ as previously described. The electrical action is substantially the same, as the circuit $m$ can be closed only when the current in the main circuit is in the right direction and above the predetermined minimum, at which time the armature $A^2$ will first be closed by the relay $R^2$ and this acting to close the circuit $m$ will act through the magnet M' to close the switch S, the relay $R^3$ next acting upon its armature $A^3$ to close the circuit $m$ and to hold it closed so long as the current is in the right direction or within the limits to which the controlling devices have been adjusted as hereinabove explained, the short-circuited coils $R^2$ opening the circuit $m$ at $A^2$ as soon as it is closed by the relay $R^3$ at $A^3$.

I wish it understood that my invention is not limited to the use of all the above described features and constructions, for some may be omitted and others may be varied or modified within the scope of the appended claims, as will readily occur to those skilled in the art.

In considering my invention in view of some that have preceded it, the fundamental difference will be found in the fact that in mine the main cutout-switch S is not operated by any absolute change of pressure in the generator or battery, but by the pressure-difference that exists between the two. This in the first place makes the apparatus far more sensitive than devices which operate upon absolute variations in the pressure of the generated or counterelectromotive force. For example, suppose an electric cutout is operated by a shunt-coil from the generator G. Then if the pressure of the generator is 100 volts, a rise of pressure of one volt would cause only 1% difference in the attraction of the electromagnetic device, which would be too insignificant to rely upon for causing effective action. Similarly, if the device is operated by a change of pressure of the battery B, and the pressure of the battery is 100 volts, a rise of pressure of only one volt will cause a change of the attraction of an electromagnetic device of only 1%. But where, as in my construction, the two pressures are subtracted one from the other, and their difference taken as the basis of attraction, such difference being only a few volts will form the entire attractive force produced by the electromagnetic device, and therefore doubling the difference of pressure will double the force of action of the electromagnetic device, although that would mean but an insignificant rise or fall in the pressure of one or other of the elements G and B. Furthermore, it is a very important feature of my construction that the electromagnetic device can be made to act by an algebraically positive pressure difference independent of whether the critical value of the current is zero, positive, or negative, that is, is an algebraically positive quantity or not; and will act in the same way to move the electromagnetic device to one side when said positive pressure-difference algebraically exceeds said given critical value, and to the other side when it algebraically diminishes below said critical value. The word "algebraically" is here taken in its usual mathematical sense to indicate that the sign + or − of the current or pressure-difference is to be taken into consideration, and not merely the absolute numerical value. For example, the electromagnetic device R or R' might be said to operate at a current of −2 amperes, which means that a reverse current of 2 amperes would be necessary to throw it off after it was once on; and the change of this value to −1, 0, or 1 ampere would be reckoned as an algebraic increase, (though an absolute decrease) of the current-value. And a third important point is to observe that the force acting to move the electromagnetic device into the cutting-out position is a positive one, and one which increases with the strength of the reverse current, or in other words increases as the algebraic value of the current diminishes below said critical value. This is due entirely to the use of a permanently polarized relay, whereby a repellent value is exerted upon it by a reverse current. In these three features, which are embodied in the following claims, my invention differs, so far as I am aware, fundamentally from all preceding inventions.

Having thus described my invention, what I claim as new and desire to secure by Letters Patent, is:

1. In combination with an electric circuit having a device generating an electromotive force and a device producing a counterelectromotive force, a main switch interposed in said circuit, electrical means for operating said switch, said electrical means being adapted to be energized, and an electromagnet having a fixed and a movable element one of which is polarized, said electromagnet being connected up with said circuit and acting to close the circuit of said electrical means when the resultant electromotive force of the circuit is such as to produce a current having a positive pressure-difference between said generated and said counterelectromotive force exceeding a predetermined algebraic minimum and to open the circuit of said electrical means when said current ceases to meet this condition.

2. In combination with an electric circuit, a device generating an electromotive force in said circuit, a device producing a counterelectromotive force in said circuit, a main switch interposed in said circuit, electrical means for operating said switch, said electrical means being adapted to be energized, and an electromagnet having a fixed and movable element one of which is polarized and having series-coils intercalated in the main circuit and shunt-coils connected across the terminals of said main switch connected up with said circuit and acting to close the circuit of said electrical means when the resultant electromotive force of the circuit is such as to produce a current in one direction only and above a predetermined minimum and to open the circuit of said electrical means when said current reverses in direction or falls below said predetermined minimum.

3. In combination with an electric circuit, a device generating an electromotive force in said circuit, a device producing a counterelectromotive force in said circuit, a main switch intercalated in said circuit and adapted to open and close the same, electrical means for operating said switch, an electromagnet having a fixed and a movable element one of which has shunt-coils and series-coils connected with said circuit and the other of which is polarized, said movable element being actuated by the fixed element in a manner to be moved in one direction by a current or excess of electromotive force in one direction and in the other direction by a current or electromotive force in the other direction in said coils, one of said elements having consequent polarity with respect to the other, and a make-and-break in the circuit of said electrical means actuated by said movable element.

4. In combination with an electric circuit, a device generating an electromotive force in said circuit, a device producing a counterelectromotive force in said circuit, a main switch intercalated in said circuit and adapted to open and close the same, electrical means for operating said switch, an electromagnet having a fixed and a movable element one of which has shunt-coils and series-coils connected with said circuit and the other of which is polarized, said movable element being actuated by the fixed element in a manner to be moved in one direction by a current or excess of electromotive force in one direction and in the other direction by a current or electromotive force in the other direction in said coils, one of said elements having consequent polarity with respect to the other, a make-and-break in the circuit of said electrical means actuated by said movable element, and means for adjustably varying the critical value of current in said coils at which said movable element will be moved to one side or the other according as the current is algebraically above or below said critical value.

5. In combination with an electric circuit, a device generating an electromotive force in said circuit, a device producing a counterelectromotive force in said circuit, a main switch interposed in said circuit, electrical means for operating said switch, said electrical means being adapted to be energized, and electrical devices connected up with said circuit and acting to close the circuit of said electrical means when the resultant electromotive force in the circuit is such as to produce a current having a positive pressure-difference between said generated and said counterelectromotive force exceeding a predetermined algebraic minimum and to open the circuit of said electrical means when said current ceases to meet this condition.

6. In combination with an electric circuit, a device generating an electromotive force in said circuit, a device producing a counterelectromotive force in said circuit, a main switch interposed in said circuit, electrical means for operating said switch, said electrical means being adapted to be energized, and electromagnet devices connected up with said circuit and acting to close the circuit of said electrical means when the resultant electromotive force in said circuit is such as to produce a current having a positive pressure-difference between said generated and said counterelectromotive force exceeding a predetermined algebraic minimum and to open the circuit of said electrical means when said current ceases to meet this condition.

7. In combination with an electric circuit, a device generating an electromotive force in said circuit, a device producing a counterelectromotive force in said circuit, a main switch intercalated in said circuit and adapted to open and close the same, electrical means for operating said switch and adapted to be energized therefor, an electromagnet having a fixed and a movable element one of which has shunt-coils and series-coils connected with said circuit and the other of which is polarized, said movable element being actuated by said fixed element in a manner to be moved in one direction by a current or excess of electromotive force in one direction and in the other direction by a current or electromotive force in the other direction in said coils, one of said elements having consequent polarity with respect to the other whereby said movable element is moved in one direction or the other according as the pressure-difference algebraically considered between said generated and said counterelectromotive force rises above or falls below a given critical value, a make-and-break in the circuit of said electrical means actuated by said movable element, and an electrically operated device intercalated in said main circuit and adapted to break the circuit of said electrical means when the current in said main circuit rises above a predetermined maximum.

8. In combination with an electric circuit, a device generating an electromotive force in said circuit, a device producing a counterelectromotive force in said circuit, a main switch intercalated in said circuit and adapted to open and close the same, electrical means for operating said switch and adapted to be energized therefor, an electromagnet having a fixed and a movable element one of which has shunt-coils and series-coils connected with said circuit and the other of which is polarized, said movable element being actuated by said fixed element in a manner to be moved in one direction by a current or excess of electromotive force in one direction and in the other direction by a current or electromotive force in the other direction in said coils, one of said elements having consequent polarity with respect to the other whereby said movable element is moved in one direction or the other according as the pressure-difference algebraically considered between said generated and said counterelectromotive force rises above or falls below a given critical value, a make-and-break in the circuit of said electrical means actuated by said movable element. an electrically operated device intercalated in said main circuit and adapted to break the circuit of said electrical means when the current in said main circuit rises above a predetermined maximum, and an electromagnet device connected with said main circuit and adapted to open the circuit of said electrical means when the potential of said main circuit rises above a predetermined maximum.

In witness whereof I have hereunto set my hand in the presence of two witnesses.

JULIUS H. GUGLER.

Witnesses:
GEORGE W. COLLES,
G. W. YOUNGS.